(12) United States Patent
Harper

(10) Patent No.: US 11,922,982 B1
(45) Date of Patent: Mar. 5, 2024

(54) TAPE DRIVE REEL INCLUDING DAMPING TO REDUCE TRACK FOLLOWING ERRORS

(71) Applicant: INTERNATIONAL BUSINESS MACHINES CORPORATION, Armonk, NY (US)

(72) Inventor: David Harper, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/932,183

(22) Filed: Sep. 14, 2022

(51) Int. Cl.
*G11B 5/55* (2006.01)

(52) U.S. Cl.
CPC .......... *G11B 5/5508* (2013.01); *G11B 5/5517* (2013.01)

(58) Field of Classification Search
None
See application file for complete search history.

(56) References Cited

U.S. PATENT DOCUMENTS

| | | | | |
|---|---|---|---|---|
| 5,377,927 A | * | 1/1995 | Erickson | G11B 23/08757 242/615.3 |
| 5,774,312 A | * | 6/1998 | Abe | B29C 45/14336 |
| 10,672,431 B2 | | 6/2020 | Argumedo et al. | |
| 2004/0238668 A1 | * | 12/2004 | Zwettler | G11B 23/08757 |
| 2006/0151651 A1 | * | 7/2006 | Stamm | G11B 23/107 242/348 |
| 2015/0294683 A1 | * | 10/2015 | Harper | G11B 15/18 360/75 |
| 2020/0118600 A1 | * | 4/2020 | Argumedo | G11B 33/148 |

FOREIGN PATENT DOCUMENTS

JP 2012108994 A 6/2012

OTHER PUBLICATIONS

Brake, M. R. et al., "Lateral Vibration and Read/Write Head Servo Dynamics in Magnetic Tape Transport," Journal of Dynamic Systems, Measurement and Control, 2010, 12 pages.

* cited by examiner

*Primary Examiner* — Peter Vincent Agustin
(74) *Attorney, Agent, or Firm* — KONRAD, RAYNES, DAVDA & VICTOR LLP; Alan S. Raynes

(57) ABSTRACT

Provided is a tape drive reel including a damping structure for reducing position error signals in a tape during operation. The tape drive reel includes a hub including a first flange and a second flange. At least one of the first flange and the second flange includes a damping layer and a single stiffener layer positioned thereon. The damping layer is positioned between the single stiffener layer and the at least one of the first flange and the second flange. The single stiffener layer is more rigid than the damping layer.

20 Claims, 4 Drawing Sheets

TAPE DRIVE REEL INCLUDING DAMPING TO REDUCE TRACK FOLLOWING ERRORS

BACKGROUND OF THE INVENTION

1. Field of the Invention

Provided are devices and methods including a tape drive reel including a damping layer and a stiffener layer to reduce track following errors during operation.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read element and then sensing the magnetic field of the magnetic media. Read and write operations may be independently synchronized with the movement of the media to ensure that the data can be read from and written to the desired location on the media.

During operation of a tape drive, where the tape drive is writing or reading data to or from a tape media, the write and read elements should be accurately positioned with respect to the tape media. Through the use of, for example, a servo system, closed loop track following functions allow for accurate placement of the tape head writer or reader elements on the tape media as data is transferred to or from the tape. The error that occurs during track following is known as the Position Error Signal (PES). Reducing PES enables more accurate placing of the data tracks onto the tape. Mechanical vibrations in the system can lead to undesirably high PES.

SUMMARY

Provided are damping structures and components having damping structures for reducing position error signals in a tape during operation, and methods for making and using such damping structures and components. A tape drive reel includes a hub including a first flange and a second flange. At least one of the first flange and the second flange includes a damping layer and a single stiffener layer positioned thereon. The damping layer is positioned between the single stiffener layer and the at least one of the first flange and the second flange. The single stiffener layer is more rigid than the damping layer.

DETAILED DESCRIPTION

Tape cartridge capacity gains generally require improved track density scaling to read ever increasing denser tracks. A key enabler for track density scaling is improving the track following performance of the tape drive. This may be accomplished by reducing the position error signal in reading and writing data during track following. Track following performance may be limited by mechanical disturbances in the system. One type of disturbance relates to the flanges of the tape reel in the cartridge. The flanges are typically formed from a polymer with glass filler and can vibrate and resonate at certain frequencies due to the rotation of the reel motors running at various speeds. The rotation motion of the media hub with flanges causes oscillations of the flanges in an up and down direction that can directly add to the track following error. These disturbances shift to higher frequencies with increasing tape speed, making it more challenging to control Position Error Signal (PES) at high tape speed. Certain embodiments relate to reducing these undesirable flange motions to reduce track following PES.

Described embodiments provide an improved tape reel that can be used in a tape cartridge in a tape drive system. Described embodiments provide a damping structure positioned on one or more tape reel flanges, to reduce the amount of PES. Certain embodiments of the damping structure may include a rigid stiffener and a damping material positioned on a flange, with the damping material positioned between the flange and the rigid stiffener.

Figure 1:
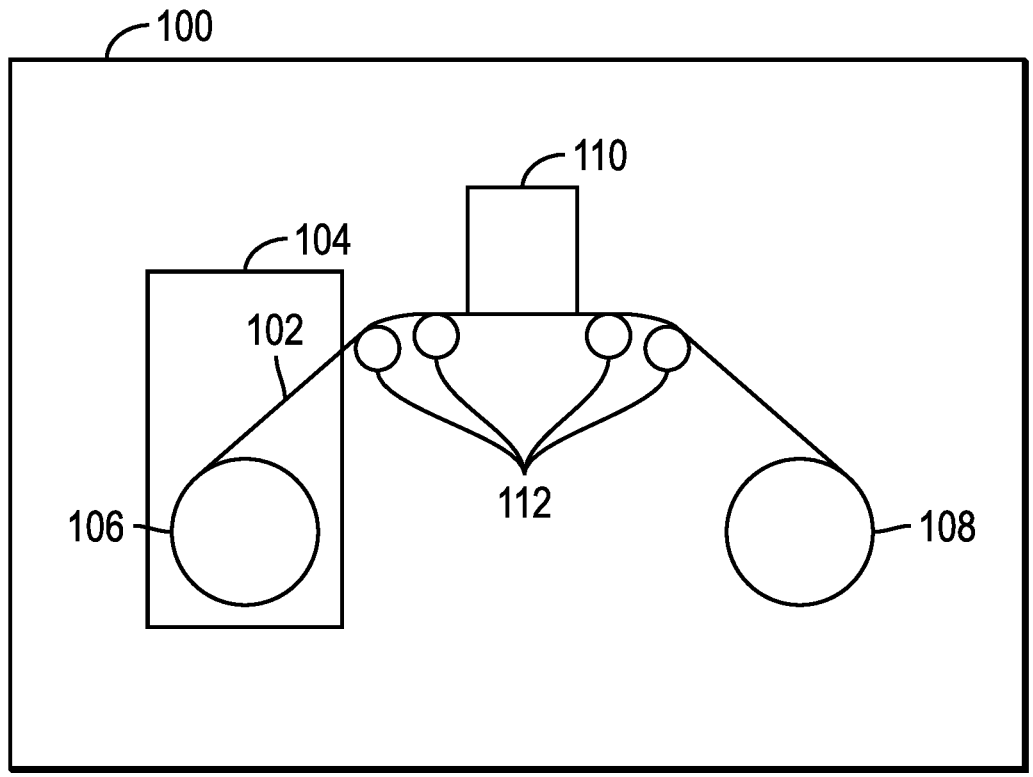
FIG. 1 illustrates a tape drive device in which embodiments are implemented.

FIG. 1 illustrates an embodiment of a tape drive 100 to read and write with respect to a magnetic tape 102 of a magnetic tape cartridge 104. The magnetic tape cartridge 104 comprises a length of magnetic tape 102 wound on one or two reels 106, 108. By way of example, the magnetic tape cartridge 104 may comprise a single reel tape, such as adhering to the Linear Tape Open (LTO) format. An example of a tape drive 100 is the International Business Machines Corporation TS1160 Tape Drive. Various implementations of the tape cartridge 104 and tape drive 100 may also be used, such as LTO type tape drives.

The tape drive 100 may further include one or more controllers (not shown) to operate the tape drive 100 in accordance with commands received from a host system. The tape drive 100 may comprise a standalone unit or comprise a part of a tape library or other subsystem. The tape drive 100 may be coupled to a host system directly, through a library, or over a network.

The tape cartridge 104 may be inserted in the tape drive 100, and loaded by the tape drive 100 mechanisms so that one or more read and/or write elements on a tape head 110 reads and/or writes information in the form of signals with respect to the magnetic tape 102 as the tape is moved by one or more motors (not shown) which rotate the reels 106, 108. Tape guide rollers 112 guide the tape 102 across the tape head 110 to stabilize the positioning of the tape 102 with respect to the tape head 110 to reduce position error signals (PES). The magnetic tape 102 typically comprises a plurality of parallel tracks, or groups of tracks. In some formats, such as the LTO format, above, the tracks are arranged in a serpentine back and forth pattern of separate wraps, as is known to those of skill in the art.

Figure 2:
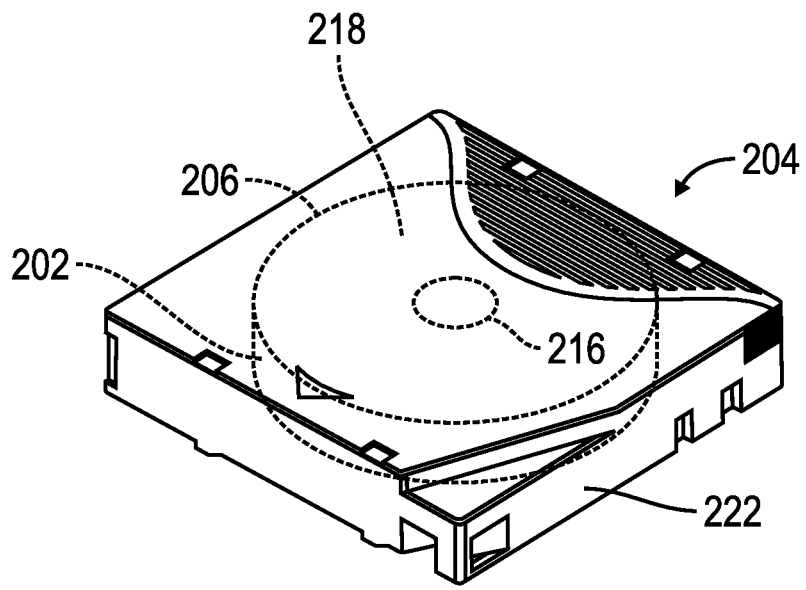
FIG. 2 illustrates a view of a tape drive cartridge in which embodiments are implemented.

FIG. 2 illustrates an example of a tape cartridge 204 in which certain embodiments may be implemented, including a reel 206 positioned in case 222. Magnetic tape 202 is wound on a hub 216 of the reel 206. FIG. 2 also illustrates the upper flange 218 of the reel 214. The tape cartridge 204 may be inserted into and removed from a tape drive system as needed.

Figure 3:
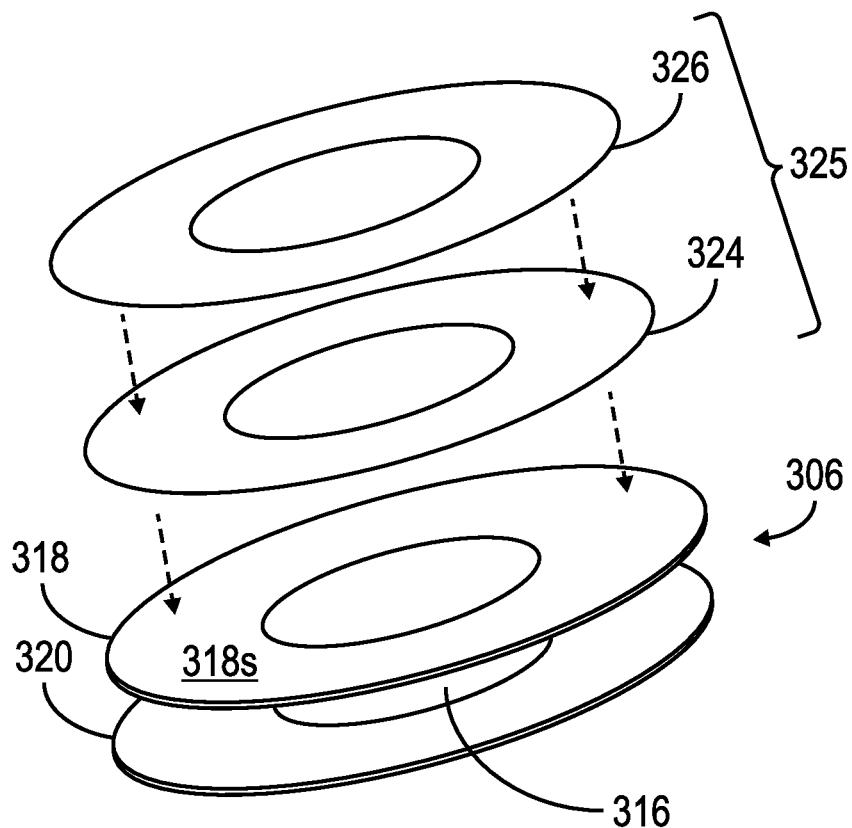
FIG. 3 illustrates an exploded view of a tape drive reel including layers on a flange, in accordance with certain embodiments.

FIG. 3 illustrates features of certain embodiments in an exploded view showing a reel 306 including a hub 316, an upper flange 318, a lower flange 320, a damping layer 324 and a stiffener layer 326. As indicated by the dotted line arrows in FIG. 3, the damping layer 324 and stiffener layer 326 may be positioned on the outer facing surface 318s of the upper flange 318 to form a damping structure 325 thereon. The damping layer 324 may be positioned between the stiffener layer 326 and the outer facing surface 318s of the upper flange 318.

The damping layer 324 may be formed from any suitable damping material, including, but not limited to, polymeric materials. In certain embodiments a viscoelastic material may be used. An example of a suitable material is a viscoelastic acrylic material designated as RA960 available from ROUSH® Enterprises.

The stiffener layer 326 may be formed from any suitable rigid material, including, but not limited to, metals and alloys such as, for example, stainless steel, plastics such as rigid polymers, and composites. In certain embodiments the damping layer 324 and the stiffener layer 326 may be laminated together and then coupled to the flange 318 on the reel 306, with the damping layer 324 positioned between the flange 318 and the stiffener layer 326. The damping layer 324 may be formed from a material that has adhesive properties, so in certain embodiments no additional adhesive is needed between the damping layer 324 and the stiffener layer 326 and between the damping layer 324 and the flange 318. In certain embodiments, the damping layer 324 may be sandwiched between and in direct contact with the stiffener layer and the flange 318. In other embodiments, an additional adhesive or some other suitable attachment mechanism may be used to couple the damping layer 324 and the stiffener layer 326 layers to each other and/or to the flange 318.

Figure 4:
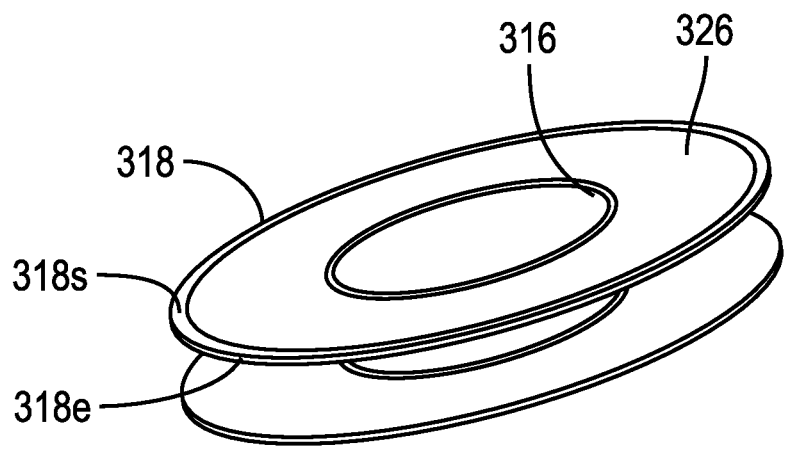
FIG. 4 illustrates a view of the tape drive reel of FIG. 3 with layers positioned on the flange, in accordance with certain embodiments.

FIG. 4 shows the reel 306 of FIG. 3 with the damping structure 325 including the damping layer 324 and the stiffener layer 326 positioned on the outer facing surface 318s of the upper reel 318. In certain embodiments the damping layer 324 and the stiffener layer 326 may have the same width, so as illustrated in FIG. 4, the damping layer 324 is covered by the stiffener layer 326.

As illustrated in FIGS. 3-4, the damping structure 325 including the damping layer 324 and the stiffener layer 326 may be ring-like in shape, with an opening in the middle. The damping structure 325 is configured to fit over all or a portion of the flange 318 outer facing surface 318s. As seen in FIG. 4, the outer facing surface 318s is almost completely covered by the stiffener layer 326 of the damping structure 325. Certain embodiments include the damping structure 325 extending to within about 1 mm of the hub 316 edge and to within about 1 mm of the outermost edge 318e of the flange 318. Other embodiments may cover more or less of the outer facing surface 318s. In general, any undesirable vibrations as the reel 304 rotates will be largest near the outermost edge 318e, so it is desirable to position the damping structure 325 close to or at the outermost edge 318e to minimize such undesirable vibrations and in turn minimize the PES.

The damping layer 324 and the stiffener layer 326 are formed to be relatively thin so as to not interfere with the operation of the reel 304 within a cartridge, where clearances may be small. In certain embodiments, both the damping layer 324 and the stiffener layer 326 may each have a thickness in the range of about 25 microns to about 150 microns. Certain preferred embodiments may include a damping layer 324 thickness in the range of from 75 microns to 125 microns and a stiffener layer 326 thickness in the range of from 50 microns to 100 microns.

Figure 5:
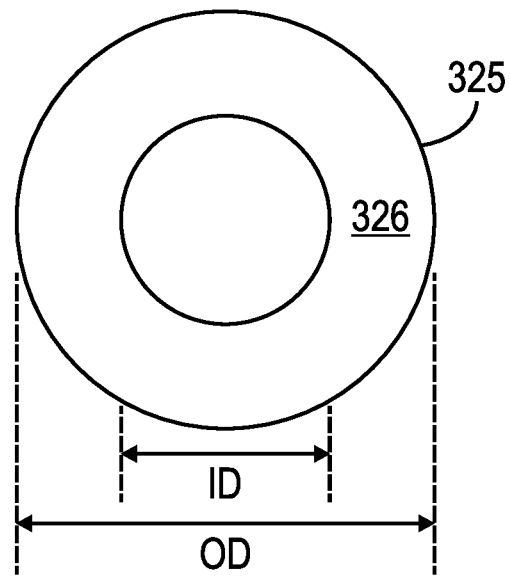
FIG. 5 illustrates a top view showing width dimensions in accordance with certain embodiments.

FIG. 5 illustrates a top view of the damping structure 325, with an upper surface of the stiffener layer 326 in view. In one embodiment the inner diameter (ID) defined by the inner portion of the damping structure 325 that surrounds a central opening is 46+/−mm and the outer diameter defined by the outer edge of the damping structure 325 is 92.0+/−0.5 mm. Other sizes may also be utilized, depending on factors including, but not limited to, the size of the reel and flanges.

Figure 6:
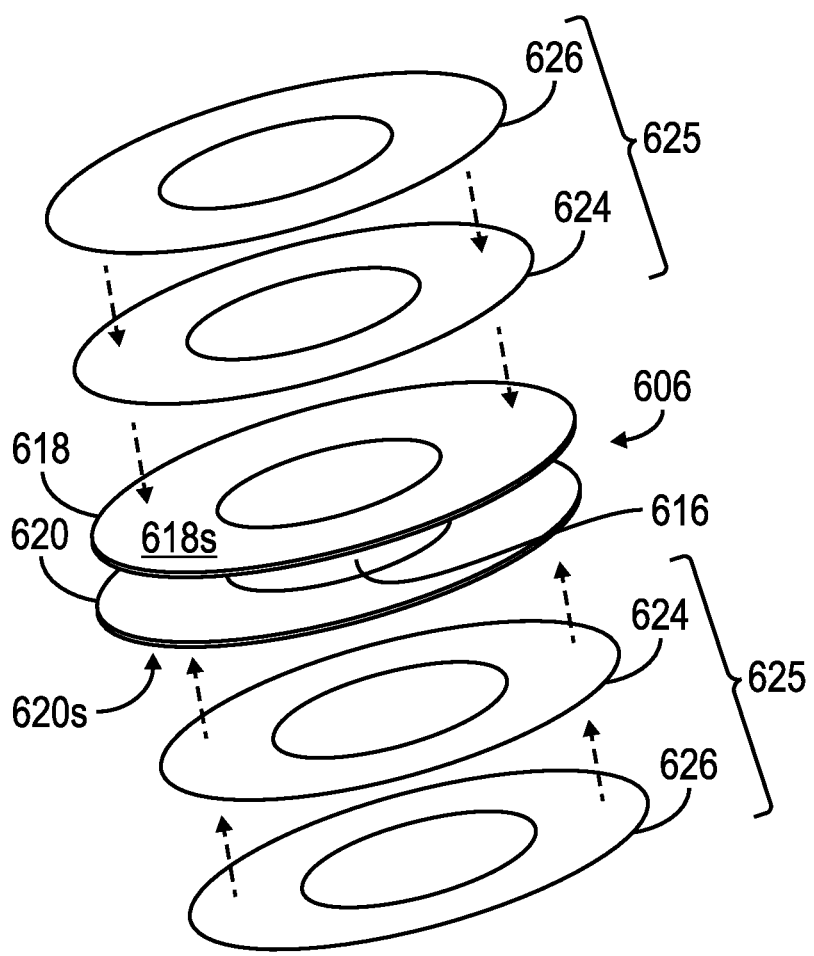
FIG. 6 illustrates an exploded view of a tape drive reel including layers on a first flange and on a second flange, in accordance with certain embodiments.

Certain embodiments may include damping and stiffener layers positioned on both hubs of a reel. FIG. 6 illustrates an embodiment including a reel and damping structure similar to that described in connection with FIGS. 3-4, including reel 606, and the damping structure 625 on both flanges 618, 620. As illustrated in FIG. 6, damping structures 625 each made up of a damping layer 624 and a stiffener layer 626 may be positioned as indicated by the dotted line arrows on both an outer facing surface 618s of the upper flange 618 and on an outer facing surface 620s of the lower flange 620.

It is believed that during operation, when as a reel such as, for example, the reel 606 of FIG. 6 having the damping structures 625 (each made up of a damping layer 624 and stiffener layer 626) positioned on the flange outer facing surfaces 618s, 620s is rotated, energy that would cause large oscillations on the flanges 618, 620 in the absence of the damping structure 625 will instead be converted into microscopic amounts of heat inside of the damping material of the damping layer 624. It is believed that the stiffener material of the stiffener layer 626 provides a support to help convert the flange oscillations into a shear motion of the damping layer 624. This lessens the size of oscillations on the flanges which in turn reduces the amount of PES during track following on the tape during operation of the tape drive.

Figure 7:
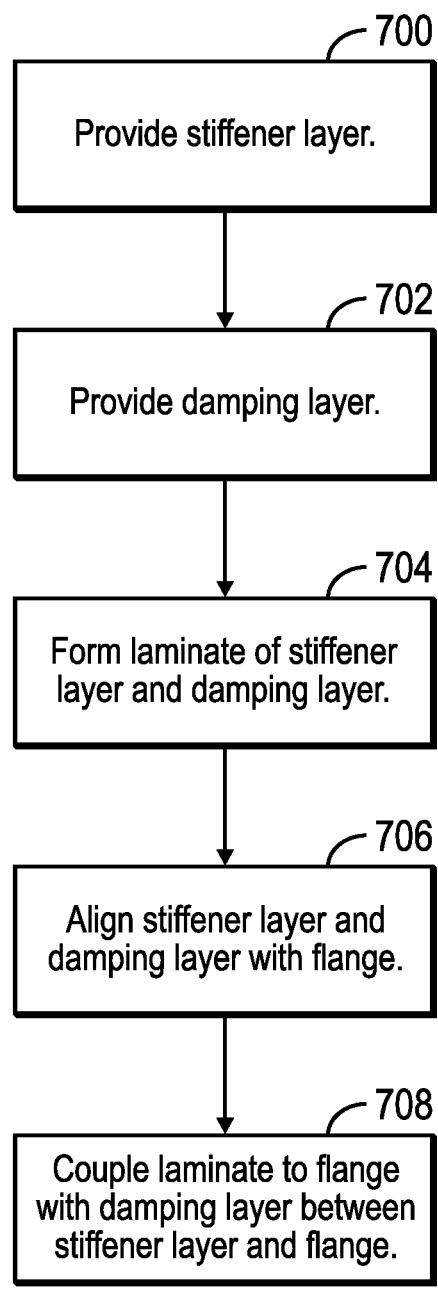
FIG. 7 illustrates a flowchart of operations to form a tape drive reel in accordance with certain embodiments.

FIG. 7 illustrates a flowchart of operations for forming a tape drive reel that reduces tracking errors during operation, in accordance with certain embodiments. Box 700 providing a stiffener material such as, for example, a stainless steel layer. Box 702 is providing a damping material such as, for example, a viscoelastic polymer layer. In certain embodiments there may be a single layer of stiffening material and a single layer of the damping material. Box 704 is laminating the stiffener and the damping layers together. Box 706 is aligning the stiffener and damping layers with the flange of a reel. Box 708 is coupling the stiffener and damping layers to the flange. In certain embodiments the damping layer is positioned between the stiffener and the flange. In addition, in certain embodiments that damping layer is in direct contact with one or both of the stiffener and the flange. It should be appreciated that modifications to the operations may be made and that certain operations may be optional. For example, in certain embodiments the stiffener and damping layers need not be laminated together prior to being coupled to the flange.

Tests were carried out comparing undamped reels with reels having damping structures positioned on the flanges, at a number of different forward direction tape velocities. The results are shown in the Table 1 below. The data showed that the damped reels had a reduced maximum PES compared to the undamped reels, with the reduction ranging from about 5% to about 25% for the damped reels, depending on the tape velocity. One advantage demonstrated by the data was that at the higher rotation speeds, the damping became more effective and the amount of reduction in PES was greater. Similarly, the standard deviation of the PES (Sigma PES) was also reduced for the damped reels versus the undamped reels.

TABLE 1

Position Error Signal (PES) Comparison

| | | | | | |
|---|---|---|---|---|---|
| Fwd. Dir. Tape Vel. (m/s) | 4.45 | 4.83 | 5.19 | 5.59 | 5.95 |
| Max PES Undamped (nm) | 160.98 | 157.4 | 169.19 | 188.67 | 210.5 |
| Max PES Damped (nm) | 148.313 | 150.28 | 149.64 | 139.61 | 157.98 |
| Max PES Ratio | 0.92131 | 0.95476 | 0.88445 | 0.73997 | 0.7505 |
| Sigma PES Undamped (nm) | — | — | 42.45 | 47.58 | 54.44 |
| Sigma PES Damped (nm) | — | — | 32.91 | 32.57 | 37.59 |

Embodiments may include damping structures and components having damping structures therein, including, but not limited to supply and take-up reels, tape drive cartridges and tape drive systems, and methods for making and using such damping structures and components having damping structures therein.

In the described embodiments, any variables i, n, etc., when used with different elements may denote a same or different instance of that element.

The terms "an embodiment", "embodiment", "embodiments", "the embodiment", "the embodiments", "one or more embodiments", "some embodiments", "certain embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by a machine system to manufacture and implement embodiments including damping structures as described herein.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape drive reel comprising:
a hub including a first flange and a second flange;
wherein the first flange and the second flange each include:
a damping layer and a stiffener layer positioned thereon;
the damping layer positioned between the stiffener layer and the flange; and
the stiffener layer being more rigid than the damping layer.

2. The tape drive reel of claim 1, wherein the damping layer comprises a viscoelastic material.

3. The tape drive reel of claim 1, wherein the stiffener layer comprises a material selected from the group consisting of metals, alloys, plastics, and composites.

4. The tape drive reel of claim 1, wherein the damping layer and the stiffener layer have a common width dimension.

5. The tape drive reel of claim 1, wherein the damping layer and the stiffener layer each have a thickness in a range of 25 microns to 150 microns.

6. A tape drive cartridge comprising the tape drive reel of claim 1.

7. The tape drive reel of claim 1, wherein the damping layer is positioned in direct contact with the flange.

8. A tape drive reel comprising:
a hub including a first flange and a second flange;
wherein at least one of the first flange and the second flange includes a damping layer and a stiffener layer positioned thereon;

the damping layer and the stiffener layer each having a thickness in a range of 25 microns to 150 microns; and the stiffener layer being more rigid than the damping layer.

9. The tape drive reel of claim 8, wherein the damping layer comprises a viscoelastic material.

10. The tape drive reel of claim 8, wherein the stiffener layer comprises a material selected from the group consisting of metals, alloys, plastics, and composites.

11. The tape drive reel of claim 8, wherein the damping layer is positioned between the stiffener layer and the at least one of the first flange and the second flange.

12. The tape drive reel of claim 11, wherein the damping layer is positioned in direct contact with the flange.

13. The tape drive reel of claim 8, wherein the damping layer and the stiffener layer are positioned on only one of the first flange and the second flange.

14. The tape drive reel of claim 8, wherein the damping layer and the stiffener layer are positioned on both the first flange and the second flange.

15. A tape drive cartridge comprising the tape drive reel of claim 8.

16. A tape drive reel comprising:
a hub including a flange;
a damping layer; and
a stiffener layer comprising a material that is more rigid than the damping layer;
wherein the damping layer is positioned between the stiffener layer and the flange; and
wherein the damping layer is positioned in direct contact with the flange.

17. The tape drive reel of claim 16, wherein the damping layer is formed to a thickness in a range of 25 microns to 150 microns and the stiffener layer is formed to a thickness in a range of 25 microns to 150 microns.

18. The tape drive reel of claim 16, wherein the flange comprises a first flange and the hub further includes a second flange, the tape drive reel further comprising:
an additional damping layer;
an additional stiffener layer comprising a material that is more rigid than the additional damping layer;
wherein the additional damping layer is positioned between the additional stiffener layer and the second flange; and
wherein the additional damping layer is positioned in direct contact with the second flange.

19. The tape drive reel of claim 16, wherein the damping layer and the stiffener layer are laminated together.

20. A tape drive cartridge comprising the tape drive reel of claim 16.

* * * * *